No. 680,108. Patented Aug. 6, 1901.
T. A. BAKKEN.
COUPLING FOR WHIFFLETREES.
(Application filed Mar. 5, 1901.)
(No Model.)
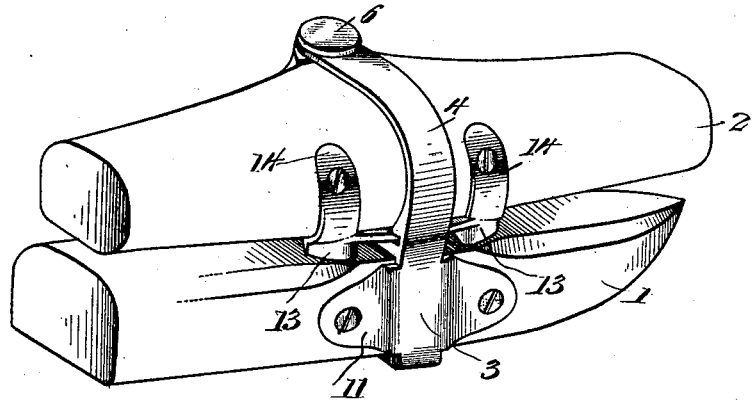
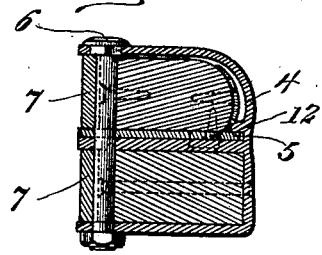
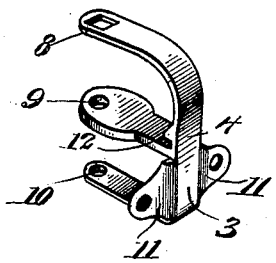
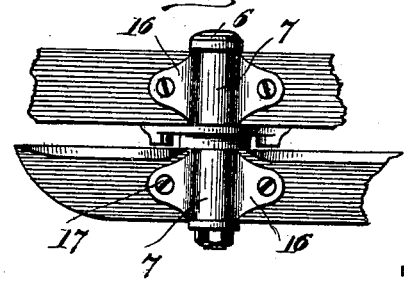
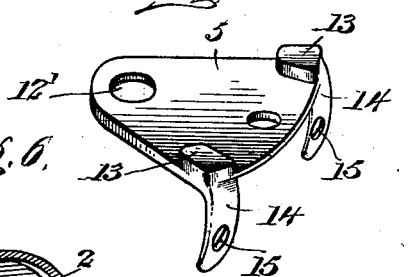
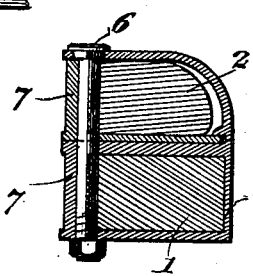
Witnesses
Inventor
Thore A. Bakken
By
Mason Fenwick Lawrence, Attorneys

UNITED STATES PATENT OFFICE.

THORE A. BAKKEN, OF DE SOTO, WISCONSIN.

COUPLING FOR WHIFFLETREES.

SPECIFICATION forming part of Letters Patent No. 680,108, dated August 6, 1901.

Application filed March 5, 1901. Serial No. 49,798. (No model.)

*To all whom it may concern:*

Be it known that I, THORE A. BAKKEN, a citizen of the United States, residing at De Soto, in the county of Vernon and State of Wisconsin, have invented certain new and useful Improvements in Couplings for Whiffletrees; and I do hereby declare the following to be a full, clear, and exact description of the invention, such as will enable others skilled in the art to which it appertains to make and use the same.

This invention relates to improvements in whiffletree-couplings, and more specifically to such devices which are provided with means for limiting the movement of the trees with respect to each other and means for preventing the tipping or turning over of the same. It has particular reference to certain improvements upon the structure shown and described in my former patent, issued January 1, 1901, No. 665,049, and contemplates certain novel constructions, combinations, and arrangements of parts to be applied thereto and used in connection therewith, as will be hereinafter fully described and claimed.

In the accompanying drawings, Figure 1 represents a perspective view of a coupling made in accordance with my invention and applied to a double and single tree. Fig. 2 represents a vertical cross-section through the said coupling. Fig. 3 is a perspective view of a clip or clevis forming part of said coupling. Fig. 4 is a front elevation of the parts of my improved coupling illustrated in Fig. 1. Fig. 5 represents a perspective view of the locking-plate; and Fig. 6 is a similar view to Fig. 2, illustrating the two lower parallel members of the clevis formed integral with the lower bearing-plate and the lock-plate formed integral with the upper bearing-plate.

As I chiefly desire in this application to describe particularly only those features which are novel over my former patent, above referred to, I shall describe but briefly the old parts herein shown, some description of the same being necessary to more clearly bring out the great importance and advantages of my improvements.

In the accompanying drawings, 1 indicates a doubletree, 2 a singletree, and 3 a coupling for securing the same together. The coupling comprises a double clip or clevis 4, a lock-plate 5, a pivot pin or bolt 6, and bearing-plates 7, inclosing said bolt. The clevis 4 comprises three parallel members, as 8, 9, and 10, provided with registering apertures at their free ends and provided with a rear connecting-piece and formed integral therewith. Flanges, as 11 11, are provided on either side of the lower half of the rear piece and adapted to be used as securing means. A ledge or projection, as 12, extends for a short distance forward from the rear connecting-piece above member 9 and is adapted to engage lock-plate 5 when in operation, and thereby prevent the possibility of the tipping or turning over of the singletree, the said lock-plate being carried by the singletree. Clevis 4 is adapted to be applied to the whiffletrees with member 8 above the singletree, member 10 below the doubletree, and member 9 between the two trees.

The lock-plate 5 is preferably of segmental form, having one of its corners apertured, as at 12', the said aperture when the plate is in operable position registering with the apertures in members 8, 9, and 10. On the opposite corners from the aperture are formed lugs, as 13 13, which in operation engage member 9 of clevis 4, and thereby limit the movement of the parts. Extending in an opposite direction from said lugs are strips 14 14, which may be of any suitable length and apertured to receive securing means, as at 15 15, whereby a clamping effect is produced upon the rear of the singletree.

Between members 8 and 9 and 9 and 10 are interposed two bearing-plates 7 7, which are formed of transversely-concaved pieces adapted to be held contiguous to the edges of trees 1 and 2, said trees being formed with transverse semicircular grooves registering with said concaved plates and forming a housing about said bolt 6. These bearing-plates partially inclosing said bolt tend to prevent wear upon the whiffletrees and add strength to the coupling and to the trees. This feature I consider one of the most important of my present improvements. The upper bearing-plate 7 may be formed integral with lock-plate 5, and the lower bearing-plate may be formed in one with members 9 and 10; but I preferably form these bearing-plates separately. Upon either opposite side of each of the plates 7 are formed flanges 16 16, which are preferably apertured to receive securing means, as at 17 17. I preferably pass bolts, rivets, or other suitable securing means through said apertures in the lower flanges, through the doubletree, and through apertures formed in flanges 11 11 for securing the parts firmly together. These securing means are seen in Fig. 2 at 18 in dotted lines. I also pass securing means through apertures 17 of the upper flanges 16, through the singletree, and through apertures 15 15 of lugs 14 14, whereby I secure not only the upper bearing-plate 7, but also the lock-plate 5. Any securing means, as screws, may be utilized at various other points of the coupling for more firmly securing the parts; but I have found the securing means just described sufficient and preferable.

I preferably form a square aperture in the free end of member 8 to receive the squared portion of a bolt 6, thereby preventing rotation of said bolt. Bolt 6 passes through the registering apertures of the three parallel members and of the lock-plate and contiguous to the upper and lower bearing-plates 7, whereby it is held against movement other than a partial rotation upon the movement of doubletree 1. I prefer to slightly enlarge the free end of member 9, as illustrated in Fig. 3, whereby the aperture therethrough does not weaken the part.

When the bearing-plates 7 are formed separately, as is preferred, the clevis 4 may be directly applied to the whiffletrees, but when formed integral with other parts, as hereinbefore described, the said clevis must be forced onto the doubletree from the end thereof and then applied to the whiffletree.

It is obvious that a firmness and rigidity of the parts will be secured by my improved construction, and yet all necessary movement will be permitted, the construction being such that it is adapted for use with equal advantage and satisfaction on any form of evener as on whiffletrees, and I contemplate such use within the spirit and scope of my invention.

Having thus fully described my invention, what I claim as new, and desire to secure by Letters Patent, is—

1. A coupling for whiffletrees, comprising a clevis, a bolt carried by the free ends thereof, and means for locking said whiffletrees in their movement with respect to each other, comprising a locking-plate, means carried thereby for engaging parts of said clevis, strips of material integral with said locking-plate and adapted to be secured about the rear of one of the trees, whereby a clamping effect will be produced upon said tree, and means for securing said strips to said tree, substantially as described.

2. A coupling for whiffletrees, comprising a double clevis, one of its members being adapted to pass above one of said trees, one below the other tree, and one between the two trees, a bolt passed through the free ends of said members, a plate carried by one of said trees for limiting the movement of the same, a housing about a portion of said bolt formed integral with said locking-plate, and a housing about another portion of said bolt and formed integral with said central member and with one of the outer members, substantially as described.

3. A coupling for whiffletrees, comprising a double clevis for securing the trees together, means for limiting the movement of said trees with respect to each other, means for preventing the singletree from tipping or turning over, a lock-plate carried by said singletree, apertured strips extending from said lock-plate to the rear of and adapted to be clamped upon the singletree, securing-flanges extending from either side of the lower half of the rear of the double clevis, a bolt adapted to pass through the free ends of said clevis to lock the parts together, bearing-plates between the upper and central, and central and lower members of said clevis, partially surrounding said bolt, securing-flanges extending from either side of each of said bearing-plates, securing means passed through the flanges of the lower bearing-plate, the doubletree and through the flanges on the rear of said clevis, and means passed through the flanges of said upper bearing-plate, the singletree and through the apertured strips extending from said locking-plate for securing the parts together, substantially as described.

In testimony whereof I hereunto affix my signature in presence of two witnesses.

THORE A. BAKKEN.

Witnesses:
HARRY G. DYER,
J. H. ROGERS.